United States Patent
Kamamoto et al.

(10) Patent No.: US 10,001,167 B2
(45) Date of Patent: Jun. 19, 2018

(54) BALL BEARING

(71) Applicant: JTEKT CORPORATION, Osaka-shi, Osaka (JP)

(72) Inventors: Shigeo Kamamoto, Kashiwara (JP); Junji Murata, Kashiba (JP); Yuki Shishihara, Kashiwara (JP); Kunishige Nakazawa, Itami (JP)

(73) Assignee: JTEKT CORPORATION, Osaka (JP)

(*) Notice: Subject to any disclaimer, the term of this patent is extended or adjusted under 35 U.S.C. 154(b) by 0 days. days.

(21) Appl. No.: 15/211,441

(22) Filed: Jul. 15, 2016

(65) Prior Publication Data
US 2017/0023060 A1 Jan. 26, 2017

(30) Foreign Application Priority Data
Jul. 24, 2015 (JP) .................. 2015-146566

(51) Int. Cl.
- F16C 33/38 (2006.01)
- F16C 19/06 (2006.01)
- F16C 33/41 (2006.01)
- F16C 43/08 (2006.01)

(52) U.S. Cl.
CPC .......... *F16C 33/3806* (2013.01); *F16C 19/06* (2013.01); *F16C 33/3856* (2013.01); *F16C 33/416* (2013.01); *F16C 43/083* (2013.01)

(58) Field of Classification Search
CPC .. F16C 33/38; F16C 33/3806; F16C 33/3837; F16C 33/3843; F16C 33/3856; F16C 33/412; F16C 33/414; F16C 33/416; F16C 33/418
See application file for complete search history.

(56) References Cited

U.S. PATENT DOCUMENTS

| | | | | |
|---|---|---|---|---|
| 2,360,419 A | * | 10/1944 | Hickling | F16C 33/414 384/534 |
| 4,534,871 A | * | 8/1985 | Johnson | F16C 33/6648 384/463 |
| 9,127,716 B2 | * | 9/2015 | Kamamoto | F16C 33/3806 |
| 2016/0319868 A1 | * | 11/2016 | Kirchhoff | F16C 33/6696 |

FOREIGN PATENT DOCUMENTS

| JP | 2008-164094 | * | 7/2008 |
|---|---|---|---|
| JP | 2014-070669 A | | 4/2014 |

* cited by examiner

*Primary Examiner* — James Pilkington
(74) *Attorney, Agent, or Firm* — Oliff PLC

(57) ABSTRACT

A ball bearing includes an inner ring having an outer periphery in which an inner raceway groove is formed, an outer ring having an inner periphery in which an outer raceway groove is formed, a plurality of balls interposed between the inner raceway groove and the outer raceway groove, and an annular cage that holds the balls. The cage includes an annular portion positioned on one side in an axial direction with respect to the balls and a plurality of cage bar portions that extend from the annular portion toward the other side in the axial direction. Each cage bar portion has a guide portion that positions the cage by coming into contact with the inner raceway groove in a non-contact area other than an area in which the corresponding ball is in contact with the inner raceway groove.

8 Claims, 8 Drawing Sheets

BALL BEARING

INCORPORATION BY REFERENCE

The disclosure of Japanese Patent Application No. 2015-146566 filed on Jul. 24, 2015 including the specification, drawings and abstract, is incorporated herein by reference in its entirety.

BACKGROUND OF THE INVENTION

1. Field of the Invention

The present invention relates to a ball bearing.

2. Description of Related Art

A ball bearing is a bearing requiring torque (rotational resistance) lower than that of a roller bearing such as a tapered roller bearing, and further torque reduction has been required recently. As depicted in FIG. 8, a conventional ball bearing has an inner ring 91, an outer ring 92, a plurality of balls 93, and an annular cage 94. The balls 93 are held by the cage 94 so as to be spaced apart from each other in the circumferential direction. The cage 94 is guided (positioned) by the balls 93 (see Japanese Patent Application Publication No. 2014-70669 (JP 2014-70669 A), for example). In a ball bearing 90 depicted in FIG. 8, in order to prevent grease between the inner ring 91 and the outer ring 92 from leaking outside, sealing devices 95 are provided to respective opposite sides of the ball bearing in the axial direction.

When a ball bearing as depicted in FIG. 8 is used as a bearing that supports a rotary shaft of a motor included in a home appliance, for example, in order to suppress generation of operation noise, noise reduction is required during rotation of the ball bearing. Noise generated by rotation of the ball bearings can be reduced to some extent by improving accuracy of dimensions and surfaces of various parts such as balls, the raceway groove of an inner ring, the raceway groove of an outer ring. However, there is a limit to the extent to which noise is attempted to be reduced by improving the accuracy of various parts constituting the ball bearing, and such accuracy improvement leads to cost increase.

SUMMARY OF THE INVENTION

An object of the present invention is to provide a ball bearing that can reduce noise while suppressing cost increase to as small a degree as possible.

According to an aspect of the present invention, a ball bearing includes: an inner ring having an outer periphery in which an inner raceway groove is formed; an outer ring having an inner periphery in which an outer raceway groove is formed; a plurality of balls interposed between the inner raceway groove and the outer raceway groove; and an annular cage that holds the balls. In the ball bearing, the cage includes an annular portion positioned on one side in an axial direction with respect to the balls and a plurality of cage bar portions that extend from the annular portion toward the other side in the axial direction. Each cage bar portion has a guide portion that positions the cage by coming into contact with the inner raceway groove in a non-contact area other than an area in which the corresponding ball is in contact with the inner raceway groove.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
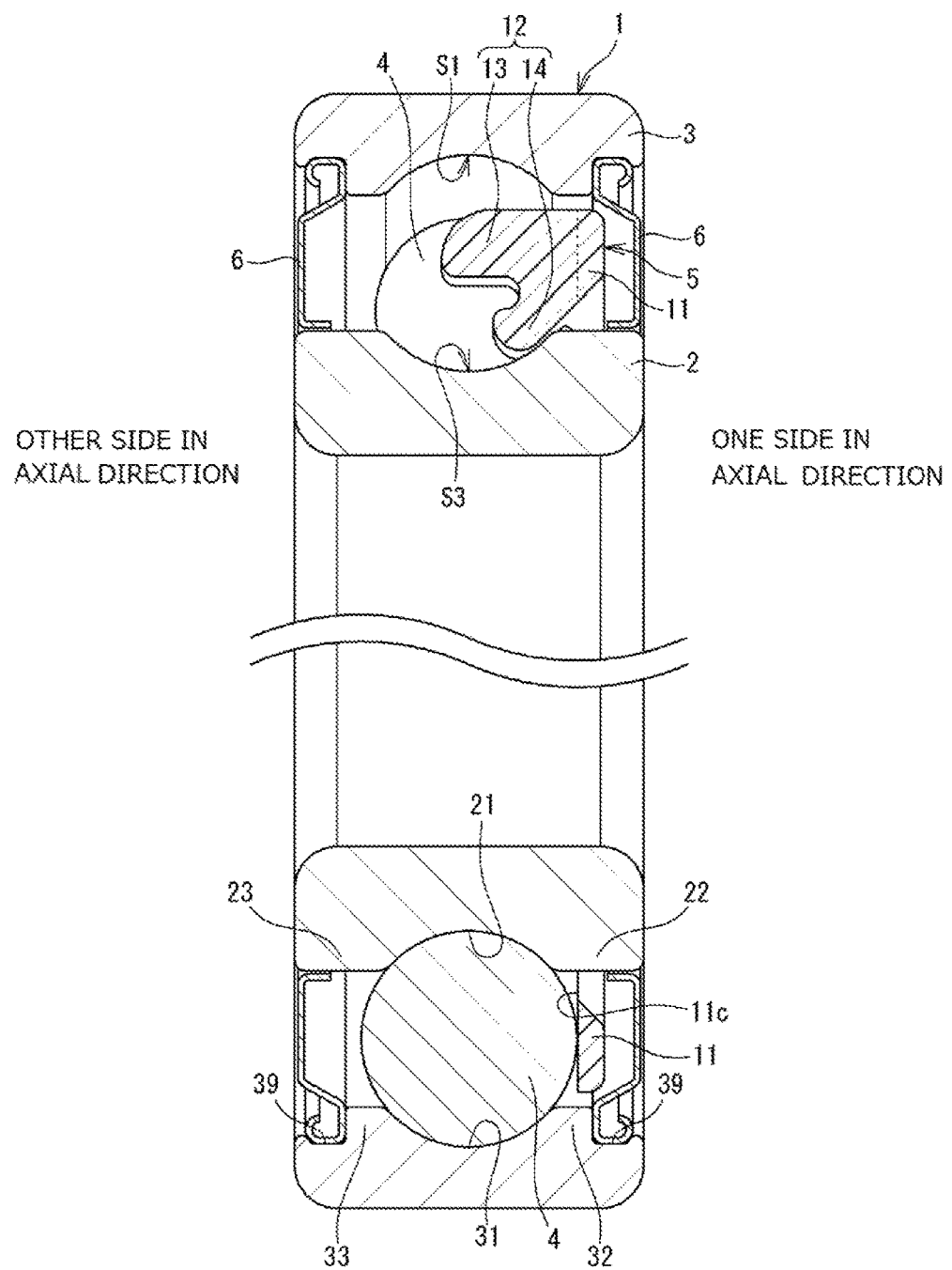
FIG. 1 is a sectional view of a ball bearing according to one embodiment of the present invention.

Embodiments of the present invention will now be described with reference to the drawings. FIG. 1 is a sectional view illustrating a ball bearing according to one embodiment of the present invention. This ball bearing 1 includes an inner ring 2, an outer ring 3, a plurality of balls 4, and an annular cage 5. The outer ring 3 is provided on the outside of the inner ring 2 in a radial direction. The balls 4 are interposed between the inner ring 2 and the outer ring 3. The cage 5 holds these balls 4.

The ball bearing 1 depicted in FIG. 1 further includes sealing devices 6 on respective opposite sides of the ball bearing 1 in an axial direction. These sealing devices 6 prevent grease in the inside of the bearing in which the balls 4 and the cage 5 are provided from leaking outside. The sealing devices 6 also have a function of preventing external foreign matter from entering the inside of the bearing.

The inner ring 2 is an annular member, and on the outer periphery thereof, an inner raceway groove 21 in which the balls 4 roll is formed. In the vertical cross-section depicted in FIG. 1, the inner raceway groove 21 has a concave circular-arc shape having a radius that is slightly larger than the radius of the balls 4. The inner ring 2 has a first shoulder portion 22 adjacent to one side of the inner raceway groove 21 in the axial direction and a second shoulder portion 23 adjacent to the other side of the inner raceway groove 21 in the axial direction.

The outer ring 3 is an annular member, and on the inner periphery thereof, an outer raceway groove 31 in which the balls 4 roll is formed. In the vertical cross-section depicted in FIG. 1, the outer raceway groove 31 has a concave circular-arc shape having a radius that is slightly larger than the radius of the balls 4. The outer ring 3 has a first shoulder portion 32 adjacent to one side of the outer raceway groove 31 in the axial direction and a second shoulder portion 33 adjacent to the other side of the outer raceway groove 31 in the axial direction. Recessed grooves 39 are formed in the inner peripheral surface of the outer ring 3 at respective opposite sides thereof The sealing devices 6 are attached to the respective recessed grooves 39. The ball bearing 1 of the present embodiment is a deep groove ball bearing.

The balls 4 are interposed between the inner raceway groove 21 and the outer raceway groove 31. When the ball bearing 1 (inner ring 2) rotates, the balls 4 roll in the inner raceway groove 21 and the outer raceway groove 31. The balls 4 are in contact with the inner raceway groove 21 at its deepest point (area S3), and are in contact with the outer raceway groove 31 at its deepest point (area S1). Each ball 4 is a steel member formed by using bearing steel, for example. The inner ring 2 and the outer ring 3 are each made of steel such as bearing steel or steel for machine structural use.

Figure 2:
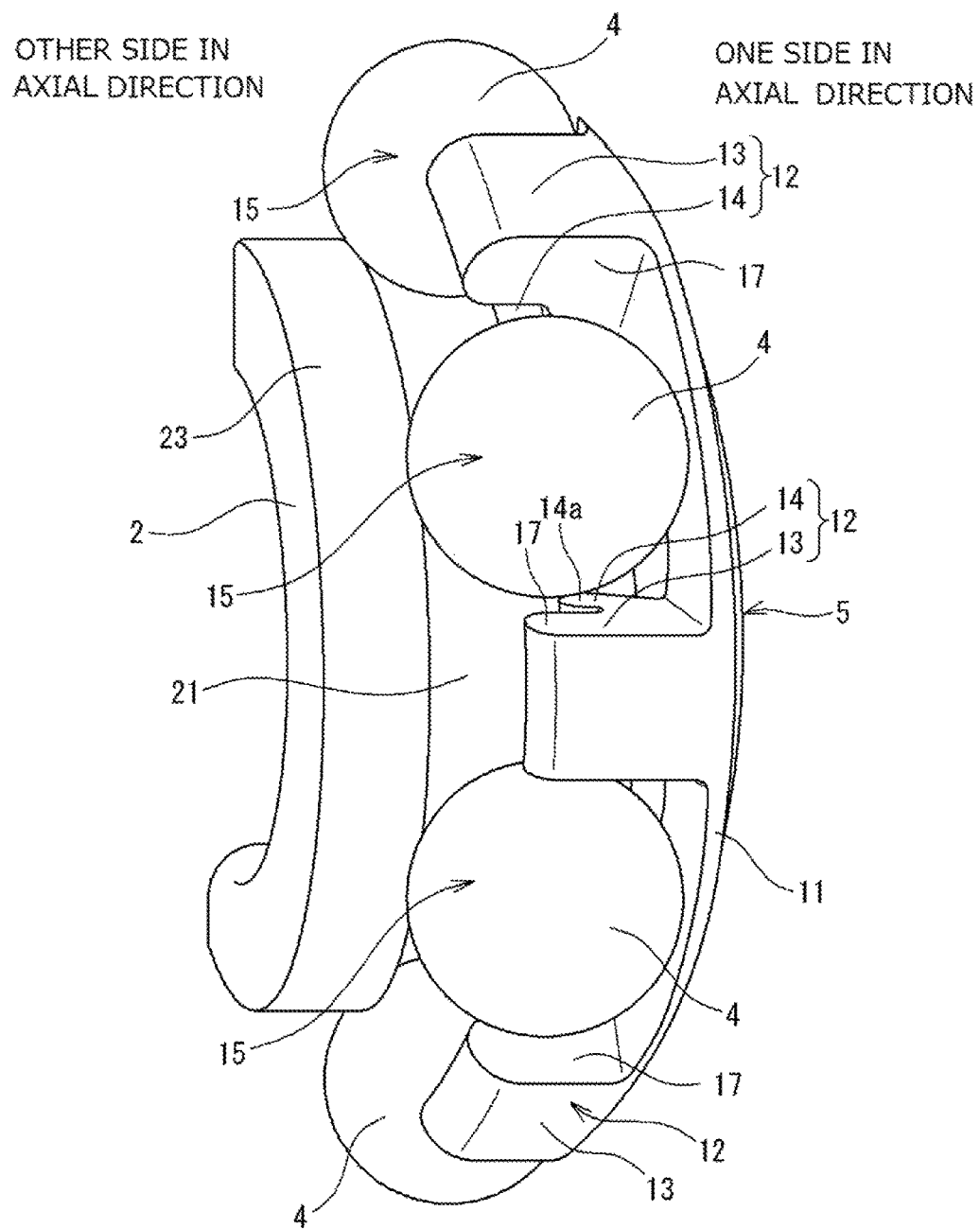
FIG. 2 is a perspective view of an inner ring, balls, and a cage.

FIG. 2 is a perspective view illustrating the inner ring 2, the balls 4, and the cage 5. In FIG. 2, the half of the inner ring 2 etc. that faces the viewer is illustrated. The cage 5 is what is called a snap cage, and includes an annular portion 11 and a plurality of cage bar portions 12. The annular portion 11 is positioned on one side in the axial direction with respect to the balls 4. The cage bar portions 12 extend from this annular portion 11 toward the other side in the axial direction. The annular portion 11 is a member having a circular ring shape, and is positioned between the shoulder portion 22 of the inner ring 2 (see FIG. 1) and the shoulder portion 32 of the outer ring 3. The cage bar portions 12 all have the same shape, and each cage bar portion 12 has a body portion 13 and a guide portion 14 described later. The cage 5 is made of resin (synthetic resin), and is produced by injection molding. The annular portion 11 and the cage bar portions 12 are integrally formed, so that the cage 5 consists of a single member.

A space that is between the cage bar portions 12 adjacent each other in the circumferential direction and is on the other side in the axial direction with respect to the annular portion 11 is a pocket 15 that accommodates each ball 4. A plurality of the pockets 15 is formed in along the circumferential direction. The cage 5 can hold the balls 4 at intervals in the circumferential direction.

Each sealing device 6 depicted in FIG. 1 is an annular shield plate, and the outer peripheral portion (radially outer portion) thereof is fitted into the corresponding recessed groove 39 of the outer ring 3, whereby the sealing device 6 is attached to the outer ring 3. The inner peripheral portion (radially inner portion) of the sealing device 6 faces the inner ring 2 (shoulder portion 22, 23) with a space interposed therebetween, and this inner peripheral portion forms a labyrinth seal. Although not depicted, the sealing device 6 may be a seal that includes an annular core member and a rubber member. The rubber member has a lip portion that is fixed to the core member and is in sliding contact with the inner ring 2.

Figure 3:
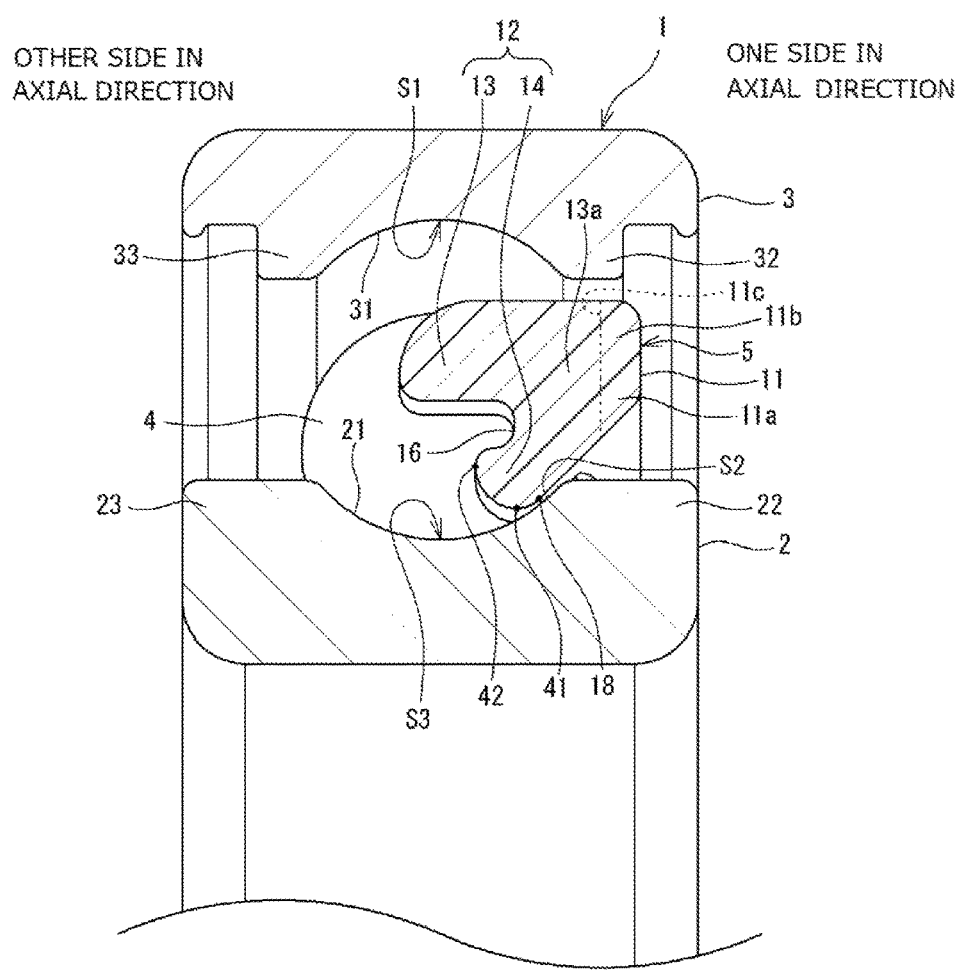
FIG. 3 is a sectional view of the inner ring, an outer ring, and the cage.

FIG. 3 is a sectional view of the inner ring 2, the outer ring 3, and the cage 5. FIG. 3 illustrates a state in which the sealing devices 6 are removed. As described above, the cage 5 includes the annular portion 11 and the cage bar portions 12. As depicted in FIG. 2 and FIG. 3, each cage bar portion 12 has the body portion 13 that is in contact with the corresponding ball 4 and the guide portion 14 that is in contact with the inner raceway groove 21.

The body portion 13 is a portion that extends straight from a radially outer portion 11b of the annular portion 11 toward the other side in the axial direction. The guide portion 14 is a portion that branches off from this body portion 13 and protrudes radially inward. The guide portion 14 of the present embodiment branches off from the body portion 13 and protrudes in a direction inclined with respect to the extending direction of the body portion 13. The guide portion 14 includes a radially inner portion 11a of the annular portion 11 and a portion that extends from a base portion 13a of the body portion 13 toward the inner raceway groove 21. The guide portion 14 branches off from the body portion 13, thereby forming a cutout portion 16 between the guide portion 14 and the body portion 13. The cutout portion 16 is a portion that is formed by cutting off part of the cage bar portion 12 in a concave circular-arc shape.

Figure 4:
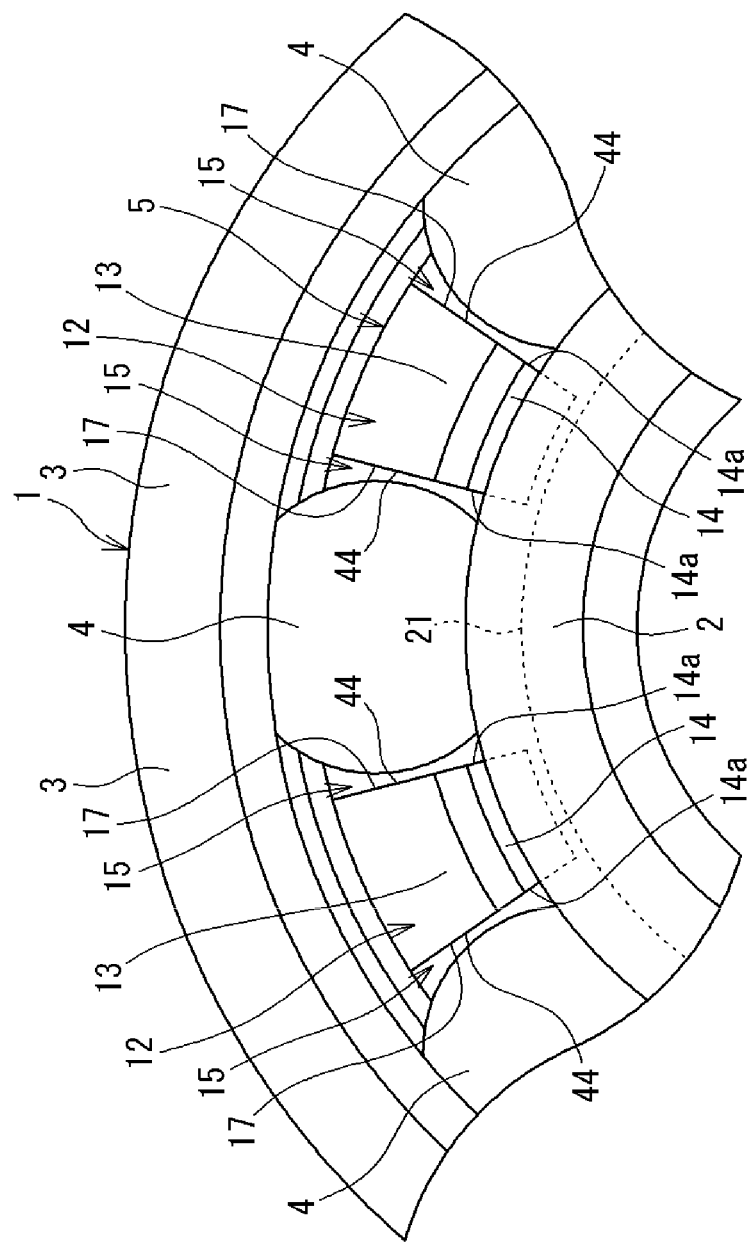
FIG. 4 is a diagram partially illustrating the inner ring, the outer ring, the balls, and the cage when viewed from the axial direction.

FIG. 4 is a diagram partially illustrating the inner ring 2, the outer ring 3, the balls 4, and the cage 5 when viewed from the axial direction. The body portion 13 of each cage bar portion 12 of the cage 5 has pocket surfaces 17 that are in point-contact with the respective balls 4 on both sides of the cage bar portion 12 in the circumferential direction. In FIG. 4, points at which the balls 4 are in contact with the pocket surfaces 17 are denoted by numerals 44. Each pocket surface 17 has a surface the distance from which to the corresponding ball 4 becomes longer from the corresponding contact point 44 with the ball 4 toward the inner ring 2. The pocket surfaces 17 of each body portion 13 of the present embodiment are flat surfaces.

Each pair of the pocket surfaces 17 between which one ball 4 is interposed forms part of the corresponding pocket 15 that accommodates the ball 4. On extended lines of the pocket surfaces 17 of each body portion 13, side surfaces 14a of the corresponding guide portion 14 are positioned. Each side surface 14a is included in part of the corresponding pocket 15, but the side surface 14a is not in contact with the corresponding ball 4.

The guide portions 14 of the cage bar portions 12 are portions that position the cage 5 in the radial direction. Specifically, when the inner ring 2 and the cage 5 are concentric with each other, as depicted in FIG. 3, part of each guide portion 14 faces the inner raceway groove 21 with a clearance therebetween. However, when the cage 5 is displaced in the radial direction, part (contact portion 18) of the guide portion 14 can come into contact with the inner raceway groove 21 in the radial direction. In particular, this guide portion 14 comes into contact with the inner raceway groove 21 in a non-contact area S2 other than an area S3 in which the ball 4 is in contact with the inner raceway groove 21. Furthermore, in the present embodiment, the guide portion 14 comes into contact with the inner raceway groove 21 only at one location in the non-contact area S2. The non-contact area S2 is in a position that is closer to the shoulder portion 22 than the area S3 in which the balls 4 are in contact with the inner raceway groove 21. This structure enables the guide portions 14 to position the cage 5 in the radial direction. Here, a portion of each guide portion 14 that comes into contact with the inner raceway groove 21 is called a "contact portion 18".

The inner raceway groove 21 has a concave circular-arc shape, and part of each guide portion 14 (including the contact portion 18) is positioned in this inner raceway groove 21. Thus, when the cage 5 is displaced toward the one side in the axial direction, part of the guide portion 14 (contact portion 18) can come into contact with the inner raceway groove 21 in the axial direction. This enables the guide portions 14 to restrict movement of the cage 5 toward the one side in the axial direction, thereby positioning the cage 5. When the cage 5 is displaced toward the other side in the axial direction, surfaces 11c of the annular portion 11 (see FIG. 1) of the cage 5 that face the respective balls 4 can come into contact with the balls 4 in the axial direction. This enables the annular portion 11 to restrict movement of the cage 5 toward the other side in the axial direction, thereby positioning the cage 5. Each surface 11c of the annular portion 11 is also included in part of the corresponding pocket 15.

Figure 5:
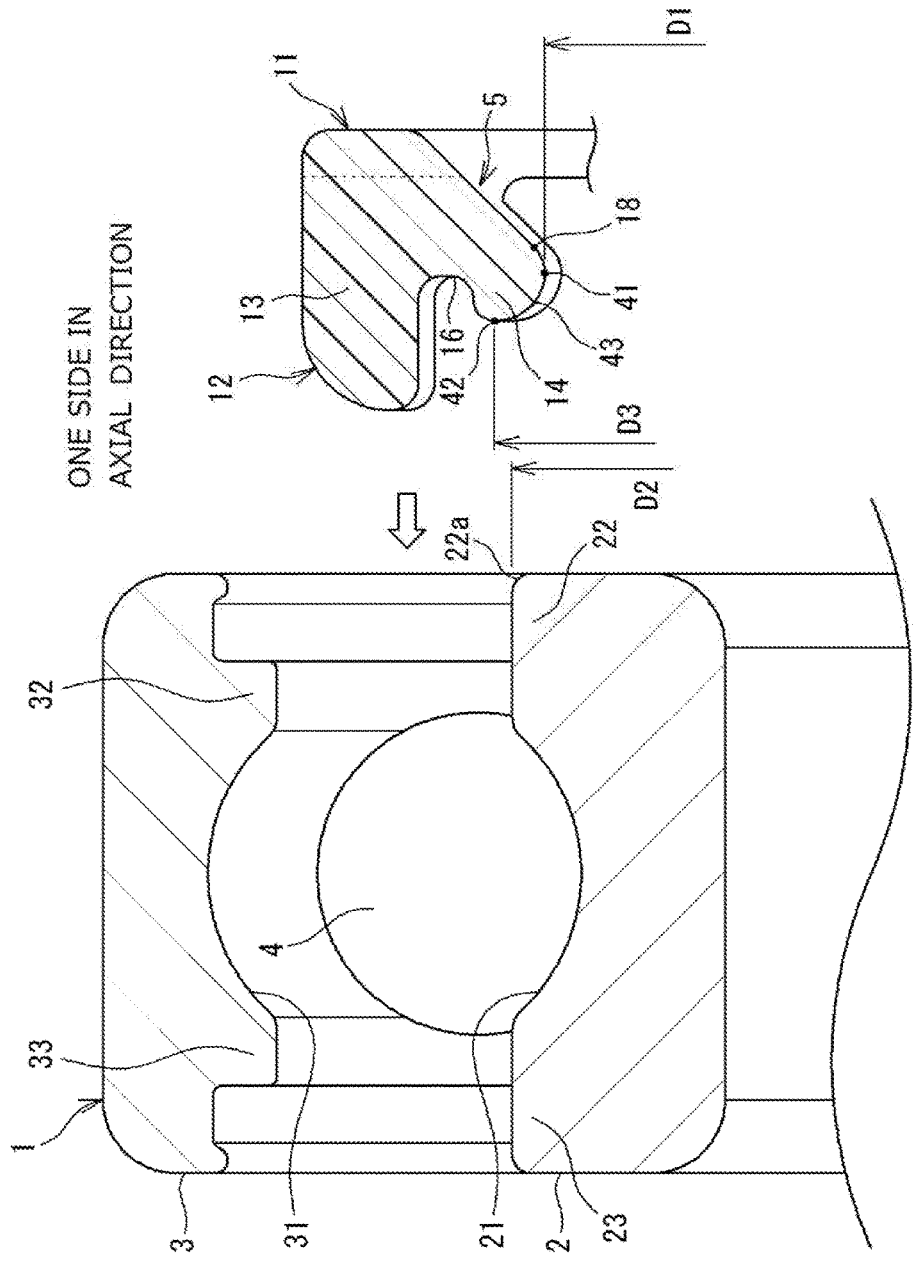
FIG. 5 is a sectional view illustrating an assembly method of the ball bearing.

The following describes an assembly method of the ball bearing 1 having the structure described above. As depicted in FIG. 5, to begin with, (all) the balls 4 are disposed between the inner ring 2 and the outer ring 3, and then the cage 5 is brought closer to the inner ring 2 from the one side in the axial direction to be assembled together. Subsequently, grease is applied to the inside of the bearing, and the sealing devices 6 (see FIG. 1) are attached to the outer ring 3.

Here, in the ball bearing 1 depicted in FIG. 1, the guide portions 14 of the cage bar portions 12 of the cage 5 are configured to be able to come into contact with the inner raceway groove 21. Accordingly, when such a cage 5 is inserted between the inner ring 2 and the outer ring 3, the guide portions 14 need to be elastically deformed radially outward. Specifically, as depicted in FIG. 5, a diameter D1 at each guide portion 14 (at a first top portion 41 positioned on the radially innermost side) is smaller than an outside diameter D2 of the inner ring 2 at the shoulder portion 22 of the inner ring 2 on the one side in the axial direction (at an axially outer end portion 22a) (D1 <D2). Thus, in order to insert this cage 5 into the bearing, radially inner portions (guide portions 14) of the cage 5 made of resin need to be elastically deformed to increase the diameter thereof.

In the present embodiment, as described above, the cage bar portions 12 of the cage 5 have the body portions 13 and the guide portions 14. Each guide portion 14 branches off from the corresponding body portion 13 and protrudes radially inward. In the present embodiment, between the guide portion 14 and the body portion 13, the cutout portion 16 is formed. This causes the guide portion 14 to be prevented from being easily affected by the stiffness of the body portion 13 and to easily deform elastically. This facilitates operation of incorporating the cage 5 between the inner ring 2 and the outer ring 3.

Furthermore, in the present embodiment, in order to further facilitate the operation of incorporating the cage 5, as depicted in FIG. 5, each guide portion 14 has an inclined surface 43 such that the radial dimension from an axis of the ball bearing 1 to the inclined surface 43 becomes larger from the first top portion 41 positioned on the radially innermost side of the guide portion 14 toward a second top portion 42 that is on the other side in the axial direction. The first top portion 41 is a portion of the guide portion 14 near the contact portion 18 that can come into contact with the inner raceway groove 21. The second top portion 42 is a portion of the guide portion 14 that is positioned at the end thereof on the other side in the axial direction. The inclined surface 43 in the present embodiment is an inclined surface having a convex circular-arc shape, but may be an inclined surface having a straight shape (not depicted).

In a state in which the guide portion 14 does not elastically deform, this second top portion 42 is positioned radially outward of the outer peripheral surface at the axially outer end portion 22a of the shoulder portion 22 of the inner ring 2 on the one side in the axial direction. Specifically, in the state in which the guide portion 14 does not elastically deform, a diameter D3 at the second top portion 42 is set to be larger than the outside diameter D2 of the outer peripheral surface (D3>D2).

Figure 6:
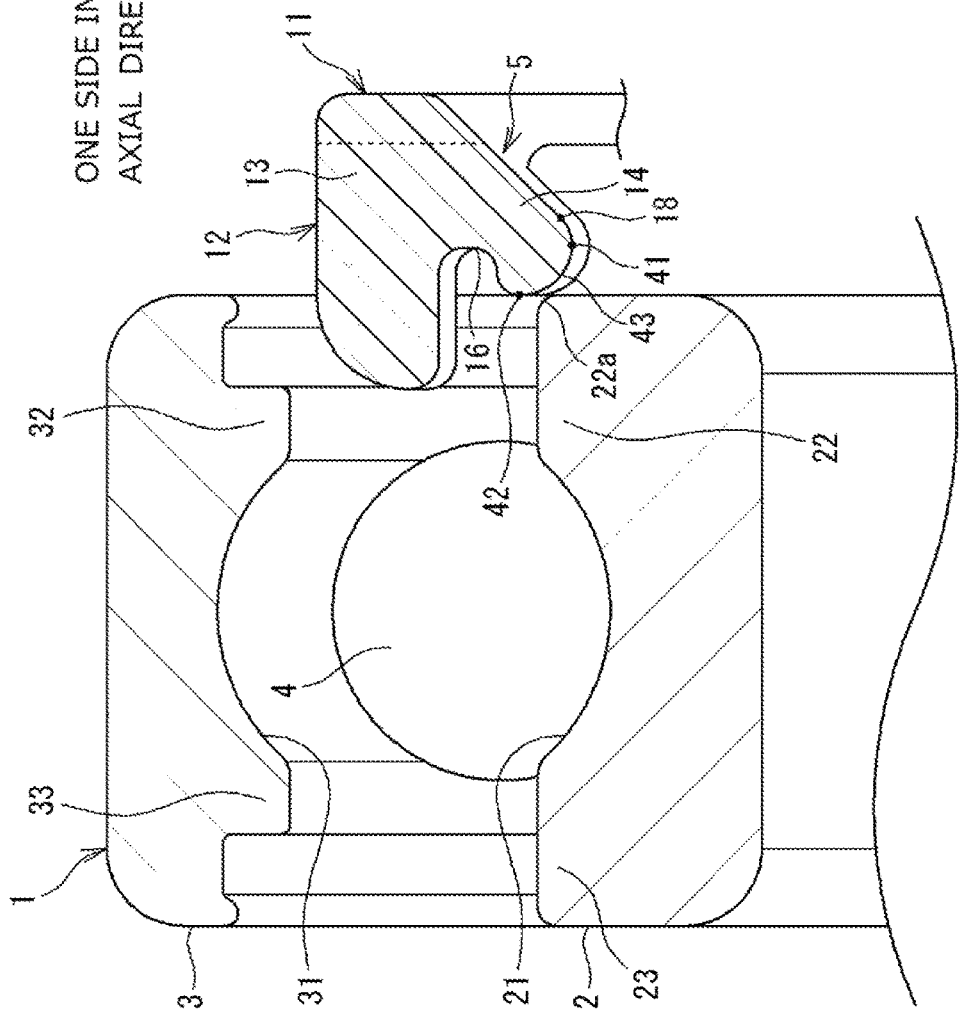
FIG. 6 is a sectional view illustrating the assembly method of the ball bearing.

With this structure, in assembling the cage 5 to the balls 4 between the inner ring 2 and the outer ring 3, when the cage 5 is brought closer to the inner ring 2 from the one side in the axial direction, the inclined surface 43 of each guide portion 14 comes into contact with the axially outer end portion 22a on the outer peripheral surface of the shoulder portion 22 of the inner ring 2 (see FIG. 6). Subsequently, when the cage 5 is moved toward the other side in the axial direction while the inclined surface 43 is being brought into sliding contact with this axially outer end portion 22a, the axially outer end portion 22a pushes the guide portion 14, and thus the guide portion 14 can be elastically deformed radially outward. In other words, the radially inner portions of the cage 5 can be elastically deformed to increase the diameter thereof. As described above, each guide portion 14 branches off from the corresponding body portion 13, and furthermore the cutout portion 16 is formed between the guide portion 14 and the body portion 13. This enables the guide portions 14 to easily deform elastically. When the cage 5 is moved toward the other side in the axial direction and the first top portion 41 of each guide portion 14 crosses over the shoulder portion 22 of the inner ring 2, the guide portion 14 moves radially inward and restores its original shape due to an elastic restoring force. As depicted in FIG. 3, the contact portion 18 of the guide portion 14 becomes close to the non-contact area S2 of the inner raceway groove 21. Thus, the guide portion 14 can come into contact with the inner raceway groove 21.

As described above, in the structure of the cage 5 of the present embodiment, in order to assemble the cage 5 between the inner ring 2 and the outer ring 3, the cage 5 only needs to be brought closer to the inner ring 2 from the one side in the axial direction (see FIG. 5 and FIG. 6). This cage 5 can be smoothly assembled between the inner ring 2 and the outer ring 3 by snap-fitting, and thus the operation of assembling the cage 5 is facilitated. When the cage 5 is assembled between the inner ring 2 and the outer ring 3 (see FIG. 3), movement of the cage 5 in the axial direction is restricted, so that the cage 5 does not become detached from the inside of the bearing.

By elastically deforming the guide portions 14, the cage 5 can be attached between the inner ring 2 and the outer ring 3 by snap-fitting. For this attachment, as depicted in FIG. 4, the side surfaces 14a of each guide portion 14 that face in the circumferential direction are positioned on virtual and radially inward extended planes of the respective pocket surfaces 17 that are flat surfaces. As described above, each pocket surface 17 has a surface the distance from which to the corresponding ball 4 becomes longer from the corresponding contact point 44 with the ball 4 toward the inner ring 2. With this structure, the distance from each side surface 14a to the corresponding ball 4 becomes longer. When the guide portions 14 elastically deform radially outward, the side surfaces 14a do not hit the balls 4, and thus this elastically deformation is not inhibited by the balls 4. This enables attachment by snap-fitting performed by elastically deforming the guide portions 14. The side surfaces 14a of each guide portion 14 may not only be positioned on the virtual extended planes of the respective pocket surfaces 17, but also be positioned apart from the virtual extended planes of the respective pocket surfaces 17 so as to be further away from the balls 4. In other words, between the side surfaces 14a of each guide portion 14 and the respective balls 4, spaces that are sufficient to prevent the side surfaces 14a from hitting the balls 4 during the elastic deformation of the guide portion 14 only need to be formed. As in the foregoing, description of the assembly method of the ball bearing 1 has been completed.

Figure 8:
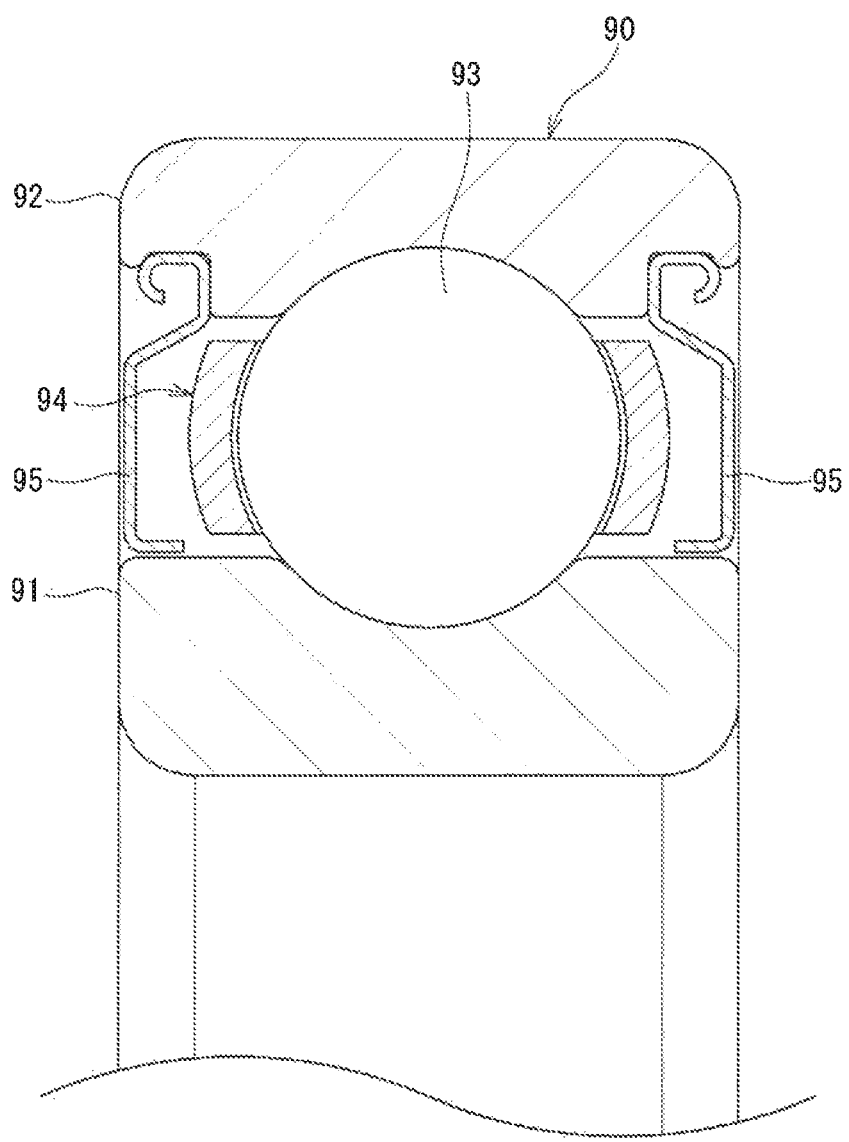
FIG. 8 is a sectional view illustrating a conventional ball bearing.

The following describes noise generated when the ball bearing 1 of the present embodiment rotates. When the ball bearing 1 rotates, vibrations (sound) generated at rolling contact portions between the inner raceway groove 21 and the balls and between the outer raceway groove 31 and the balls 4, and at sliding contact portions of the cage 5 vibrate the outer ring 3, and are transmitted outside the bearing. When sound caused by vibration of the outer ring 3 at its natural frequency is heard from the outer ring 3 regardless of the number of revolutions, the sound is noise to be suppressed. If the structure of the conventional ball bearing 90 depicted in FIG. 8 is used in which the cage 94 is positioned by the balls 93, vibrations of the cage 94 generated by contact with the balls 93 are transmitted to the cage 94, the balls 93, oil films formed between the balls 93 and the outer ring 92, and the outer ring 92 in this order as a transmission path, and the vibrations of this outer ring 92 cause the noise to be suppressed.

In view of this, the ball bearing 1 of the present embodiment is structured such that the guide portions 14 of the cage bar portions 12 of the cage 5 come into contact with the inner raceway groove 21 of the inner ring 2. This contact positions the cage 5. This structure creates, as a transmission path for vibrations of the cage 5 that are generated by the contact with the inner raceway groove 21, a path passing through the cage 5, the inner ring 2, oil films formed between the inner ring 2 and the balls 4, the balls 4, oil films formed between the balls 4 and the outer ring 3, and the outer ring 3 in this order. This path is longer than the conventional path. In other words, in the ball bearing 1 of the present embodiment, resistance of vibration transmission to the outer ring 3 as a noise source to the outside can be increased, whereby noise can be reduced. In the present embodiment, another member (additional member) for reducing noise of the ball bearing 1 is not used, and thus cost increase of the ball bearing 1 can be suppressed. The inner raceway groove 21 is originally finished (ground) so as to be in contact with the balls 4. This eliminates the need of additional finishing on the inner ring 2 for bringing the cage 5 (guide portions 14) into contact therewith, thereby preventing cost increase.

Consequently, the ball bearing 1 of the present embodiment enables noise reduction while suppressing cost increase of the ball bearing 1 to as small a degree as possible.

Furthermore, in the ball bearing 1 of the present embodiment, the guide portions 14 come into contact with the inner raceway groove 21 in the non-contact area S2 other than the area S3 in which the balls 4 are in contact with the inner raceway groove 21. This can prevent the area S3 in which the balls 4 are in contact with the inner raceway groove 21 from being scratched by contact with the cage 5, and thus the useful life of the bearing can be prevented from becoming short. As depicted in FIG. 3, in order to position the cage 5, each guide portion 14 comes into contact with the inner raceway groove 21 only at one location (contact portion 18) in the non-contact area S2. This enables the shear resistance of grease between the inner ring 2 and the cage 5 to be reduced. Consequently, the torque of the ball bearing 1 can be reduced.

The shear of grease between the inner ring 2 and the cage 5 becomes a cause of deterioration of grease in addition to an increase in rotational torque. However, in the ball bearing 1 of the present embodiment, the guide portion 14 of each cage bar portion 12 comes into contact with the inner raceway groove 21 of the inner ring 2 at one location (contact portion 18). This reduces an area in which the grease is sheared. Consequently, deterioration of grease can be suppressed, and the useful life of grease can be prevented from becoming short.

As described above (see FIG. 4), the pocket surfaces 17 of the body portion 13 of each cage bar portion 12 of the cage 5 are in point-contact with the balls 4. Each pocket surface 17 has a surface (flat surface) the distance from which to the corresponding ball 4 becomes longer from the corresponding contact point 44 with the ball 4 toward the inner ring 2. This enables the shear resistance of grease between the balls 4 and the cage bar portions 12 (body portions 13) to be reduced, thereby contributing to the reduction in torque of the ball bearing 1.

The shear of grease between the balls 4 and the cage 5 becomes a cause of deterioration of grease in addition to an increase in rotational torque. However, in the ball bearing 1 of the present embodiment, the cage 5 is configured to come into point-contact with the balls 4 at the pocket surfaces 17 thereof. Thus, an area in which the grease is sheared is smaller than that of the conventional ball bearing (see FIG. 8). Consequently, deterioration of grease can be suppressed, and the useful life of grease can be prevented from becoming short.

The following describes a state of contact between the inner raceway groove 21 of the inner ring 2 and the cage 5 (contact portion 18). In the present embodiment depicted in FIG. 4, the radially inner outline shape of each guide portion 14 is formed in a shape extending along the inner raceway groove 21 in the circumferential direction. In this case, a certain clearance can be left along the circumferential direction between the guide portion 14 and the non-contact area S2 of the inner raceway groove 21. When the cage 5 is displaced in the radial direction, the guide portion 14 (contact portion 18) comes into line-contact with the non-contact area S2 (see FIG. 3).

Figure 7:
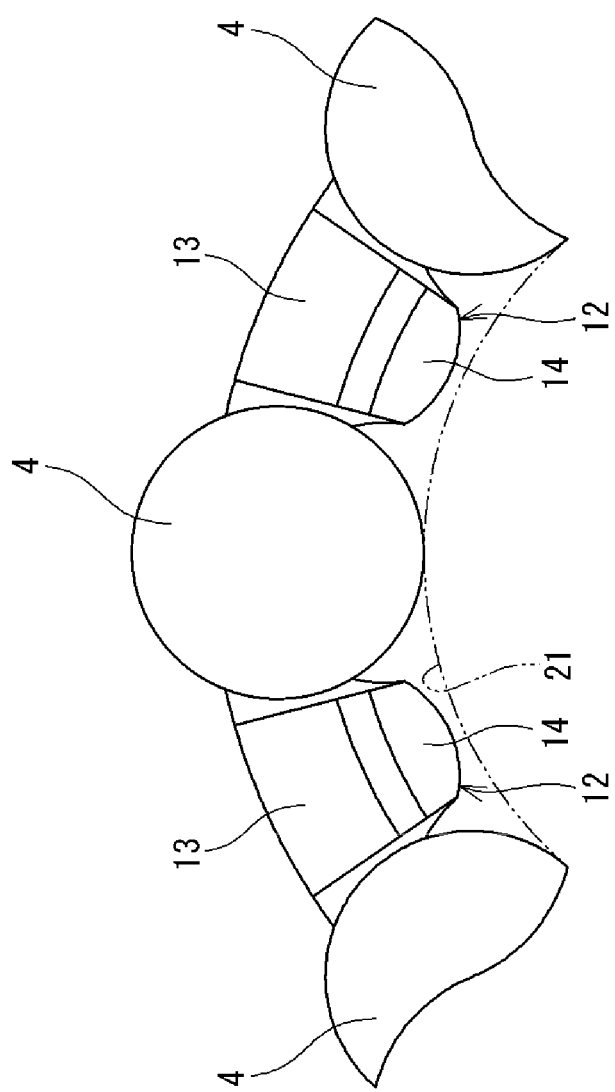
FIG. 7 is an explanatory diagram illustrating a modification of the cage.

Alternatively, the guide portion 14 (contact portion 18) may be configured to come into point-contact with the non-contact area S2. For this point-contact, as depicted in FIG. 7, the radially inner outline shape of each guide portion 14 may be formed in a shape not extending along the shape of the inner raceway groove 21 in the circumferential direction when the cage 5 is viewed from the axial direction. Specifically, when the cage 5 is viewed from the axial direction, the radially inner outline of the guide portion 14 may be formed in a convex circular-arc shape having a radius (radius of curvature) smaller than that of the inner raceway groove 21. In this case, each guide portion 14 as a whole is in a spherical shape (shape extending along a spherical surface), and the corresponding contact portion 18 is included in this spherical shape. The spherical shape may be a complex spherical surface having a plurality of centers or having a plurality of radii of curvature. In this manner, the configuration by which the guide portion 14 comes into point-contact with the inner raceway groove 21 enables the shear resistance of grease between the guide portion 14 and the inner raceway groove 21 to be further reduced. This can contribute to the reduction in torque of the ball bearing 1. The shear of grease can also be reduced, and the useful life of grease can be prevented from becoming short.

In the cage 5 of the present embodiment (see FIG. 2), all surfaces of the cage that the annular portion 11 and all the cage bar portions 12 have consist of a group of surfaces that can be seen from the one side in the axial direction and surfaces that can be seen from the other side in the axial direction. In other words, each of the surfaces included in all surfaces of the cage 5 can be seen from the one side in the axial direction or from the other side in the axial direction without exception. With this structure, although not depicted, by a two-piece die including a first die that moves toward one side in an axial direction and a second die that moves toward the other side in the axial direction, the cage 5 made of resin can be produced. Consequently, mass productivity of the cage 5 is enhanced. Production of the cage 5 using this two-piece die is performed by injection molding.

The embodiments described above in the foregoing are merely examples in all respects, and are not limiting. Specifically, the ball bearing of the present invention is not limited to the embodiments depicted in the drawings, and may be structured in a different manner within the scope of the present invention. The embodiments have been described in which the ball bearing is a deep groove ball bearing, but the ball bearing may be an angular contact ball bearing.

The present invention enables resistance of vibration transmission to the outer ring as a noise source to the outside to be increased, and noise reduction of the ball bearing while suppressing cost increase to as small a degree as possible.

What is claimed is:

1. A ball bearing comprising:
   an inner ring having an outer periphery in which an inner raceway groove is formed;
   an outer ring having an inner periphery in which an outer raceway groove is formed;
   a plurality of balls interposed between the inner raceway groove and the outer raceway groove; and
   an annular cage holding the plurality of balls, wherein:
     the annular cage includes: (i) an annular portion positioned on one side of the annular cage in an axial direction with respect to the plurality of balls, and (ii) a plurality of cage bar portions that extend from the annular portion toward another side of the annular cage in the axial direction;
     each cage bar portion includes a guide portion that branches off from a body portion of the cage bar portion, the guide portion positions the cage by contacting with the inner raceway groove in an area defined between each of the adjacent plurality of balls, the guide portion having a radially inner side that extends in a circumferential direction of the inner ring and the outer ring, the radially inner side of the guide portion having a convex circular-arc shape, wherein a cutout portion is located between the guide portion and the body portion extending in the axial direction;
     the guide portion has an inclined surface such that a radial dimension from an axis of the ball bearing to the inclined surface becomes larger from a first top portion positioned on a radially innermost side of the guide portion toward a second top portion that is positioned on the another side of the annular cage in the axial direction; and
     the second top portion is positioned radially outward of an outer peripheral surface of a shoulder portion of the inner ring on the one side of the annular cage in the axial direction.

2. The ball bearing according to claim 1, wherein the guide portion contacts the inner raceway groove at one location in the area defined between each of the adjacent plurality of balls.

3. The ball bearing according to claim 2, wherein:
   each cage bar portion further has the body portion having a pocket surface that comes into point-contact with one of the plurality of balls; and
   the guide portion branches off from the body portion and protrudes radially inward.

4. The ball bearing according to claim 2, wherein
   each cage bar portion includes the body portion having a pocket surface, the pocket surface defining a contact point where one of the plurality of balls contacts the pocket surface, and a distance between the one of the plurality of balls and the pocket surface increases from the contact point towards the outer ring.

5. The ball bearing according to claim 1, wherein:
   each cage bar portion further has the body portion having a pocket surface that comes into point-contact with one of the plurality of balls; and
   the guide portion branches off from the body portion and protrudes radially inward.

6. The ball bearing according to claim 5, wherein
   the pocket surface of the body portion of each cage bar portion defines a contact point where one of the plurality of balls contacts the pocket surface, and a distance between the one of the plurality of balls and the pocket surface increases from the contact point towards the outer ring.

7. The ball bearing according to claim 1, wherein
   each cage bar portion includes the body portion having a pocket surface, the pocket surface defining a contact point where one of the plurality of balls contacts the pocket surface, and a distance between the one of the plurality of balls and the pocket surface increases from the contact point towards the outer ring.

8. The ball bearing according to claim 1, wherein the radially inner side of the guide portion has a radius of curvature smaller than a radius of curvature of the inner raceway groove.

* * * * *